United States Patent
Urabe et al.

(10) Patent No.: US 6,591,351 B1
(45) Date of Patent: Jul. 8, 2003

(54) STORAGE SYSTEM MAKING POSSIBLE DATA SYNCHRONIZATION CONFIRMATION AT TIME OF ASYNCHRONOUS REMOTE COPY

(75) Inventors: Kiichiro Urabe, Isehara (JP); Ikuo Uratani, Hatano (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 09/663,205

(22) Filed: Sep. 18, 2000

(30) Foreign Application Priority Data

May 25, 2000 (JP) ........................................ 2000-159547

(51) Int. Cl.[7] .............................................. G06F 12/16
(52) U.S. Cl. ...................... 711/162; 711/114; 711/156; 707/204; 714/6
(58) Field of Search ................................ 711/114, 162, 711/156; 714/6; 707/204

(56) References Cited

U.S. PATENT DOCUMENTS 6,044,444 A * 3/2000 Ofek .......................... 711/162
6,073,209 A * 6/2000 Bergsten .................... 711/114
6,163,856 A * 12/2000 Dio et al. .................... 714/4

FOREIGN PATENT DOCUMENTS

JP 8-509565 10/1996
WO WO 94/25919 11/1994

OTHER PUBLICATIONS

D. Patterson et al, "A Case for Redundant Arrays of Inexpensive Disks (RAID)", University of California at Berkeley, Dec. 1987.

* cited by examiner

Primary Examiner—Hiep T. Nguyen
(74) Attorney, Agent, or Firm—Mattingly, Stanger & Malur, P.C.

(57) ABSTRACT

A synchronization confirmation method required for operation of a database is provided to a host device connected to a disk device which provides remote asynchronous data transfer. Immediately after commit of write data, an application of the host device issues a sync command which requires synchronization confirmation. A disk control device notifies the host device of a number concerning latest data received from the host device of a local side and a number concerning latest data received by a remote side. When the two numbers have coincided with each other, the host device judges the commit operation to have been completed.

14 Claims, 5 Drawing Sheets

STORAGE SYSTEM MAKING POSSIBLE DATA SYNCHRONIZATION CONFIRMATION AT TIME OF ASYNCHRONOUS REMOTE COPY

BACKGROUND OF THE INVENTION

The present invention relates to data synchronization control in asynchronous remote copy between disk control devices.

In computer systems of recent years, basic business of banks and stock companies has been shifted from centralized management using a large sized computer to a distributed database system (DDBMS) around a client/server system. In such a distributed database system environment, there is adopted an HA (High Availability) cluster configuration for processing data by using a plurality of servers and disk array devices in response to a client request. In such an HA cluster configuration, there is adopted a method of duplicating data between data centers located in remote places by way of precaution against a disaster such as an earthquake. As for duplication, there is typically adopted a method of effecting remote connection of two disk array devices (storage systems) via a public line or a private line, and copying write data to be fed from a host computer to a local disk array device to a remote disk array device.

Methods for effecting duplication between disk array devices are broadly classified into a synchronous system and an asynchronous system.

In the synchronous system, a write request from a host device of local side is first written into a cache of a disk array device of the local side. Subsequently, the disk array device of the local side transfers data written into the cache to a remote disk array device. Upon receiving an acknowledgement signal indicating that write request data has been received by a disk array device of remote side, the disk array device of the local side thereafter returns an acknowledgement about the write request to the host. In other words, the disk array device of the local side makes sure that data has been copied to the disk array device of the remote side, and returns an acknowledgement to the host. This acknowledgement ensures the host that data has been delivered to the remote side. (The term "synchronous" is used in the meaning that a write request from the host and copying onto the disk array device of the remote side are conducted in synchronism.) Since a delay is caused by waiting for an acknowledgement signal from the remote side, this synchronous system is suitable for a relatively short distance (of at most 100 km) causing a short propagation delay of data transmission between the local side and the remote side. However, the synchronous system is not suitable for long distance transfer using, for example, a public line network or the like. By the way, data recorded in the disk array devices of the local side and the remote side are written onto respective physical disks via respective drive control circuits.

On the other hand, the asynchronous system is suited for long distance transfer. As for an acknowledgement (write completion) to a host device of the local side about a write request issued by the host device of the local side, the write completion is returned to the host device at the time point when data of the write request has been written into a cache of the local side. After the acknowledgement to the host device, the data written into the cache is copied (transferred) to a disk array device of the remote side at different timing (in this meaning, this system is asynchronous). In this asynchronous system, an acknowledgement about the above described write request is returned to the host device irrespective of timing of transferring data to the disk array device of the remote side. Therefore, the acknowledgement timing is made earlier as compared with the synchronous system, and the host can shift to the next processing earlier.

By the way, as for the remote copy, it is described in Tokuhyo-Hei-8-509565.

SUMMARY OF THE INVENTION

In the above described method of transferring data to the remote side asynchronously, the disk array device of the local side reports the write request completion to the host at the time point when the data has been stored in the disk array device of the local side, irrespective of whether data has been stored on the remote side or not. Therefore, it is difficult for the host of the local side to confirm the completion of synchronization of the host write request to the remote side (i.e., determine whether data generated by the host write request has been transferred positively to the disk array device of the remote side). This confirmation of synchronization completion of the host write request on the remote side is needed especially in commit (assurance that data has been stored in a storage positively) in a history log file or the like of a database with a transaction of the database taken as the unit. By the way, the commit means a series of processing of writing update results of a plurality of databases concerning one transaction into an actual storage system together with a log file.

Furthermore, from the viewpoint of data recovery at the time of a disaster, there is a problem that data which are left in the disk array device and which have not been transferred yet are lost because of a fault of a primary site (main site), and it is impossible to know assured data after takeover to a secondary site (back-up site) is conducted and operation is started in the secondary site.

However, the asynchronous transfer system of the above described conventional technique does not have a synchronization confirmation method for a host I/O because of inherent characteristics of asynchronous transfer. In other words, there is not provided a method of determining whether a write request at a commit point for a transaction fed from an APP (application program) has been positively written into a remote site (secondary site), which is needed for operation of a database (DB).

Hereafter, problems will be described concretely. First, the case where a computer is connected to one storage system will be described. Thereafter, the problems will be described definitely as to the case where the storage system is conducting asynchronous data transfer (asynchronous remote copy).

First, the case where one storage system is connected to a computer will now be described. If an application of the computer executes a write command (request), then typically data of the write command is simply written into a data buffer included in the computer, in such a state that there is not a commit command. Data in the data buffer does not coincide with data in the storage system. If thereafter the application issues a commit command, then the data in the data buffer is actually written in the storage system by a write command. Thereafter, the storage system stores write data in a cache memory. (At this time point, the data in the storage system coincides with the data in the computer.) Thereupon, the storage system acknowledgements the computer which has issued the write command, with write request completion. Upon confirming the write request completion, the computer returns an acknowledgement for the commit command to the application. By means of this return, the application knows that the data in the storage system coincides with the data in the computer.

Subsequently, the case where asynchronous remote copy is being conducted will now be described. If an application of the computer issues a commit command, then data in the data buffer is written into a cache of the storage system of the local side by a write command. As its acknowledgement, the storage system of the local side returns write completion to the computer. Upon receiving the write completion, the computer returns an acknowledgement for a commit to the application. However, this return merely indicates that the data of the storage system of the local side coincides with the data in the data buffer. If the application attempts to continue the processing by using the data of the remote side, in the case where the data in the storage system of the local side disappears after the storage system of the local side returns write request completion and before copying data to the remote side is finished, therefore, processing is continued by using erroneous data, although a commit return is received and it is made sure that data is determined in the storage system. In other words, if a trouble or the like has occurred during asynchronous remote copy, then in some cases the computer application cannot obtain a satisfactory result by means of the conventional commit function.

In this way, the asynchronous remote copy of the conventional technique does not have a data synchronization confirmation method for the host I/O because of characteristics of the asynchronous transfer. As a result, the asynchronous transfer system of the conventional technique has a problem that it cannot be determined whether a write request at a commit point for a transaction fed from an APP (application program) has been positively written into a remote site (secondary site), which is needed for operation of a database (DB).

An object of the present invention is to make possible confirmation of the data synchronization to the remote site concerning the host I/O (write request) at an arbitrary time point or by taking a commit of the host application as the unit.

The above described object can be realized by a storage system of a local side connected to an upper device of the local side and a storage system of a remote side and used. The storage system of the local side includes means for receiving a write command from the upper device, means for transmitting data contained in the write command to the storage system of the remote side, means for receiving a query command for inquiring whether the storage system of the remote side has received the data, from the upper device, and means for transmitting an acknowledgement to the query command, to the upper device.

Furthermore, the above described object can be realized by a storage system communicating with an upper device. The storage system includes a first interface circuit supplied with a write command from the upper device, a second interface circuit for outputting data contained in the write command and information identifying the data to a different storage system, the first interface circuit supplied with a query command concerning the data from the upper device, the first interface circuit for outputting information identifying the data outputted together with the data, before transmission from the second interface, to the upper device, the second interface circuit supplied with the information inputted to the different storage system together with the data inputted to the different storage system, and the first interface circuit for outputting the information inputted to the second interface circuit, to the upper device.

BRIEF DESCRIPTION OF THE DRAWINGS

The above and further advantages of the present invention may be better understood by referring to the following description taken in conjunction with the accompanying drawings.

DETAILED DESCRIPTION OF THE EMBODIMENTS

Figure 1:
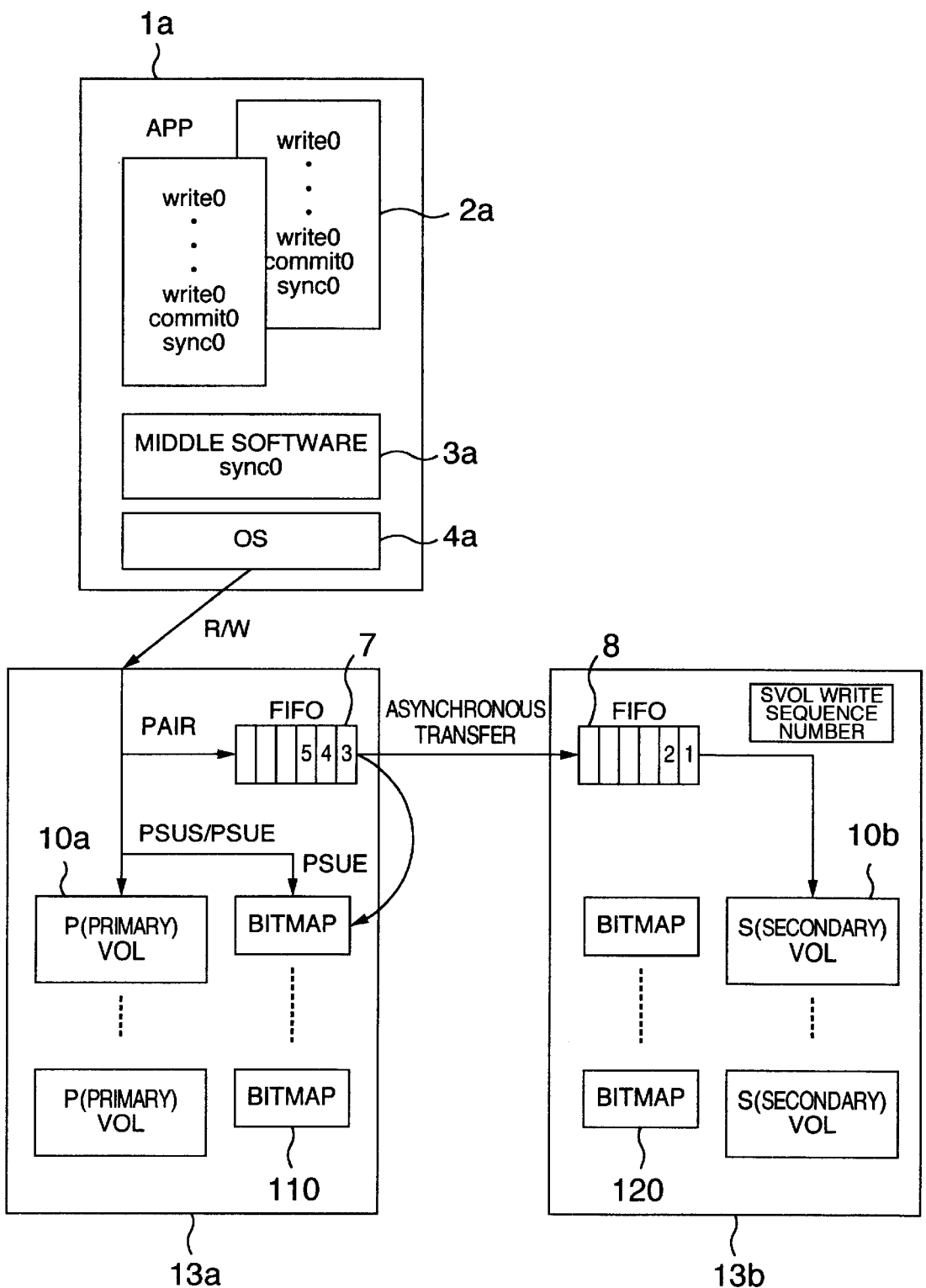
FIG. 1 is a logical block diagram showing a storage system according to a first embodiment of the present invention.

Hereafter, the first embodiment of the present invention will be described in detail by referring to FIGS. 1 to 3. First, a system configuration example to which the present invention is applied will be described by referring to FIG. 3. FIG. 3 is a system block diagram showing the whole configuration of a typical HA cluster. In the ensuing description, it is assumed that a disk array device 13a is a local device (or a primary site) and a disk array device 13b is a remote device (or a secondary site or back-up site). Furthermore, it is assumed that reference numerals with "a" added thereto represent the local side and reference numerals with "b" added thereto represent the remote side.

Host computers 1a and 1b forming an HA cluster include APPs (application programs) 2a and 2b such as databases, middle software 3a and 3b, OSs (operating systems) 4a and 4b for controlling the APP and middle software, and I/O I/Fs (input output interfaces) 23a and 23b each for controlling input and output of a command or the like between a disk array device and the host computer.

The middle software 3a and 3b are command control software. On the remote side (in the secondary site), the middle software 3a or 3b cancels a write inhibition state, in which the host of the secondary site side is inhibited from writing data into the disk array device of the secondary site, at the time of operation of the secondary site caused by a failure in the primary site. On the other hand, on the primary site side, the middle software 3a or 3b sends a pair control order, such as generation of an initial pair state in which data are squared between the primary site or the secondary site, or pair state suspension (a state in which a logical pair is cut), to the large-sized disk array devices 13a or 13b. In the present embodiment, a sync command unique to the present invention is provided by the middle software 3a. Details thereof will be described later.

I/O requests from the host computer 1a or 1b are sent to the large-sized disk array device 13a or 13b via an "I/O I/F" (23a, 23b), respectively.

The large-sized disk array device 13a or 13b receives an I/O request from the host at a host I/F control circuit 17a or 17b, and writes data of a write request (write data) into a cache 21a or 21b. The data written into the cache 21a or 21b is written into an actual physical disk 9a or 9b by a drive control 22a or 22b. As for the data written into the cache, the large-sized disk array device assures the storage of the data. Furthermore, the large-sized disk array devices protect a plurality of physical disks 9 by using a RAID (Redundancy Array of Inexpensive Drives) 1, a RAID 5, or the like, and prepare for a fault of physical disks. As for the RAID, it is described in "A Case for Redundant Arrays of Inexpensive Disks (RAID)" by David A. Patterson, et al., December 1987, U. C. Berkley.

As for duplication of data between the large-sized disk array devices, data written into the cache 21a of the local large-sized disk array device 13a is first sent to the remote large-sized disk array device 13b via the remote I/F control circuits 18a and 18b, and data transfer paths 20a and 20b such as public lines and private lines. The remote large-sized disk array device 13b writes the data thus sent into the cache 21b. In the same way as data writing into the physical disk device 9a on the local side, the remote large-sized disk array device 13b then writes the received data into the physical disk 9b.

In this duplicated state, the remote host I/F control 17b inhibits the remote host 1b from writing.

Here, data which are not yet transferred to the remote side are difference-managed by bit map memories 11a and 11b. The difference data (data which are not yet transferred) managed by the difference information in the bit map memories are transferred to the remote side asynchronously without being synchronized to the I/O request issued by the host device 1a. The bit map memory for managing the difference data will be described later.

With reference to FIG. 3, processing of a sync command or the like defined in the present invention and conducted in the disk array device is implemented by providing a microprocessor, or a typical memory (such as a DRAM) for holding a program or data referred to by the microprocessor in the host I/F control circuit, the remote I/F control circuit, or the like, and making the microprocessor execute the program. Furthermore, the processing may be implemented by providing a dedicated circuit in a control circuit. On the other hand, it is also possible to provide a microprocessor for controlling the disk array device and a memory for storing a program in a place other than the host/IF control circuit and the remote I/F control circuit, and thereby execute the program while controlling the host/IF control circuit and the remote I/F control circuit.

FIG. 1 shows logical blocks for implementing the present embodiment in the system configuration of FIG. 3.

Logical blocks of the host device 1a of the local side include an APP (application program) 2a which is application software, middle software 3a for executing generation of an initial pair state of volumes in the large-sized disk array devices 13a and 13b and pair control such as pair state suspension, and an OS 4a.

A large-sized disk array device 13a serving as a local site and a large-sized disk array device 13b serving as a remote site are connected by data transfer paths (20a and 20b of FIG. 3) such as optical fibers and a wide area line network which are not illustrated. Volumes in the large-sized disk array devices 13a and 13b include a PVOL (primary volume) 10a and a SVOL (secondary volume) 10b, respectively. Data fed from the host are copied from the PVOL 10a into the SVOL 10b, and thus duplicated. By the way, these volumes are held in the physical disks 9a and 9b shown in FIG. 3.

A bit map 110 (held in the bit map memory 11a of FIG. 3) and a bit map 120 (held in the bit map memory 11b of FIG. 3) are data difference management tables between the PVOL 10a and the SVOL 10b. Each of the data difference management tables can be managed by taking a volume as the unit. The bit map 110 and the bit map 120 have been obtained by converting all data blocks of the PVOL and the SVOL to bit maps by taking several tens KB (kilo-bytes) as the unit, respectively. The bit map 110 represents data which have been stored in the PVOL (primary volume), but not transferred to the remote site. The bit map 120 represents data which have been transferred to the remote site, but not stored in the SVOL (secondary volume). Typically, if the pair state (duplicated state) is suspended (PSUS), then new data fed from the host is written into only the PVOL 10a. Therefore, this data is subjected to difference management as noncoincidence between the PVOL 10a and the SVOL 10b by the bit maps 110 and 120.

A FIFO 7 of the local side and a FIFO 8 of the remote side are buffer queues for asynchronous transfer between the large-sized disk array device 13a of the local side and the large-sized disk array device 13b of the remote side. The FIFO 7 of the local side and the FIFO 8 of the remote side are used at the time of the pair state.

Write data of I/O (input-output) fed from the host 1a of the local side are placed in a cache corresponding to the PVOL 10a of the large-sized disk array device 13a. Thereafter, the data are written into the physical disk 9a. At the same time, a sequence number serving as an identifier for identifying an I/O is added to an I/O unit. In other words, the host I/O data are arranged in order, and queued temporarily in the FIFO 7 in the order of write request issuance from the host computer. By the way, the identifier may be any kind, such as a time stamp, instead of the sequence number, so long as data can be identified uniquely in the order of write request issuance from the host computer. Furthermore, when queuing data on a cache into the FIFO buffer 7, there may be adopted such a method of producing duplication of data on the cache and actually effecting queuing. In order to prevent an increase of data quantity, however, the queue is desired to be a queue for managing pointer addresses or the like for managing the data on the cache. If in this case actual data are transferred to the remote side, then actual data are transferred from the cache.

Asynchronously with the I/O completion response report to the host, the data with the sequence numbers added thereto are transferred from the large-sized disk array device 13a to the large-sized disk array device 13b. Upon receiving the data, the large-sized disk array device 13b of the remote side makes the data queue in the FIFO 8 in the order of sequence number. The data queued in the FIFO 8 are placed in the cache corresponding to the SVOL (subsidiary volume) 10b in the order of sequence number, and then written into the physical disk 9b. The reason why the received data are temporarily queued in the FIFO 8 and then placed in the cache in the order of sequence number is that the large-sized disk array device 13b of the remote side does not necessarily receive the data of write request in the order of write request issuance from the host computer, for reasons of control of the large-sized disk array device 13a of the local side and the communication state of the transfer paths. In the present embodiment, the sequentiality is ensured by queuing the received data in the FIFO 8, and then reading the data from the FIFO in the order of sequence number and formally writing the data into the cache corresponding to the SVOL as described above, when the sequence numbers assigned to the received data become complete in the order of number. As a matter of course, the large-sized disk array device 13b can write the received data directly into the cache as SVOL data, provided that it is ensured that the order of data received by the large-sized disk array device 13b coincides with the order of write request issuance from the host computer.

In the case where asynchronous transfer cannot be conducted because of a transfer fault or the like of the transmission paths between the large-sized disk array devices 13a and 13b, the large-sized disk array devices 13a and 13b manage the data which have not yet been transferred and which are queued in the FIFOs 7 and 8, in the bit maps 110 and 120 as difference data by taking a volume as the unit, and bring duplication into a fault suspension (PSUE) state.

The middle software 3a of the host 1a checks the state of the large-sized disk array device 13a. If the state is the pair state, then the middle software 3a recognizes the duplicated state and knows that asynchronous transfer is under way. In addition, in the case of the PSUS or PSUE state, the middle software 3a recognizes that duplication is in the suspension state.

How confirmation of the synchronization to the remote site at the time of commit of the APP 2a according to the present invention is executed by cooperation of the APP 2a and the middle software 3a of the host 1a and the large-sized disk array device 13a will now be described.

This is made possible by the middle software 3a of the host 1a which receives a request of synchronization confirmation from the APP 2a, compares the states of the large-sized disk array devices 13a and 13b and sequence numbers concerning data stored in the PVOL and SVOL, obtained from the queues of the FIFOs 7 and 8, determines whether data of "WRITE I/O" (write request) immediately preceding the issuance of a commit command is synchronized to the remote site, and returns a return value to the APP 2a.

How a request of synchronization to the remote site at the time of commit of the APP 2a is executed by cooperation of the APP 2a and the middle software 3a of the host 1a and the large-sized disk array device 13a will hereafter be described concretely.

When a commit is issued from the APP 2a of the host 1a and synchronization of the commit of the APP 2a is requested to the remote site, the APP 2a writes it into the database as a transaction, and finally issues a commit. Typically, the processing is finished with this commit.

When a data has a duplication configuration between the large-sized disk array devices, furthermore a "sync command" which is a feature of the present invention is issued immediately after the commit in the present invention. The sync command is a library and host command operating on the host device, and is provided as a software product via a software storage medium such as a CDROM or a floppy disk. The sync command is provided to the application by the middle software 3. Furthermore, the sync command is defined as a parameter by "group" (described later) and "timeout" for specifying a maximum synchronization completion wait time.

By the way, the timing of issuing the sync command is not restricted to immediately after the commit. At the time when the application software judges data synchronization between the remote side and the local side to be necessary, the sync command can be issued arbitrarily. In other words, selection as to whether synchronization is attempted can be conducted arbitrarily by either issuing the sync command or not. Therefore, there is a degree of freedom for application software using the sync command. When a commit is conducted by taking a transaction as the unit in asynchronous remote copy, however, a flow of two commands in application, i.e., issuance of the commit command, and subsequent issuance of the sync command of the present invention is inevitable in the sense that it is determined whether write data is positively stored in the large-sized disk array device of the remote side.

Upon receiving the sync command, the middle software 3a checks the pair state of the large-sized disk array devices. In the case of the pair state, the middle software 3a acquires a latest PVOL sequence number of the FIFO 7 (which is a sequence number provided to data which is received latest from the host, written into the cache 21a of the local side, and not yet copied into the remote side) from the disk array device 13a of the local side, and holds the latest sequence number of the PVOL as the sequence number immediately following the "commit." Subsequently, the middle software 3a acquires the SVOL write sequence number in the large-sized disk array device 13b of the remote side (a sequence number provided to data latest written into the SVOL (the cache 21b of the remote side)) via the large-sized disk array device 13a of local side. In addition, the middle software 3a compares the PVOL sequence number with the SVOL write sequence number, acquires the SVOL write sequence number repetitively and repeats the test until the relation (PVOL sequence number)<(SVOL write sequence number)is satisfied. If the condition is satisfied, then the middle software 3a returns a return response to the APP 2a which is the calling source of the sync command, as the response of synchronization completion. Upon receiving this return, i.e., upon completion of the sync command, the APP 2a regards synchronization as completed.

Hereafter, the acquisition of the PVOL sequence number and the SVOL write sequence number and data synchronization will be described in detail. The PVOL sequence number is a sequence number provided to data latest written into the cache of the local side. For example, in FIG. 1, therefore, a latest PVOL sequence number "5" is acquired from the FIFO 7, and this is reported to the middle software 3a. On the other hand, as for the SVOL write sequence number of the remote side, data "1" and "2" are queued in the FIFO 8. Therefore, it is known that up to data having a sequence number of "0" have been written into the SVOL. In other words, it can be known that the number "0" is the SVOL write sequence number by using the FIFO 8. This SVOL write sequence number "0" is reported to the middle software 3a. In this state, (PVOL sequence number "5")>(SVOL write sequence number "0"). Accordingly, the middle software 3a judges synchronization to be unaccomplished.

As the transfer of data from the local side to the remote side proceeds, data run out in the FIFO 7. On the other hand, data are received in the FIFO 8. For example, data having sequence numbers "1" to "5" are stored in the FIFO 8. Thereafter, if received data from the FIFO 8 are stored in the cache corresponding to the SVOL, the data stored in the FIFO 8 decrease. At this time, the sequence numbers assigned to data newly written into the SVOL become new SVOL write sequence numbers. Therefore, the sequence number assigned to data actually written from the FIFO 8 into the cache corresponding to the SVOL is stored in a memory provided in the large-sized storage system of the local side as the SVOL write sequence number. When there is a query from the local side, the sequence number in this memory can be reported as the SVOL write sequence number. If the remote side reports "5" as the SVOL write sequence number, then the middle software judges the data synchronization to have been accomplished, because the relation (PVOL sequence number "5")<(SVOL write sequence number "0") is satisfied.

Instead of deriving the PVOL sequence number and the SVOL write sequence number from the FIFOs in the foregoing description, it is also possible to provide storage means such as RAMs of the local side and the remote side separately, store the two numbers in the storage means as occasion demands, and read them under the necessity.

Furthermore, in the foregoing description, the APP 2a in the host 1a is one process from the OS 4a. However, the APP 2a may exist as a plurality of processes. In this case, the sync command is issued from each of the plurality of processes. By acquiring the latest PVOL sequence number at the time when receiving each sync command so as to correspond to each sync command, and comparing this with the latest SVOL sequence number, the synchronization confirmation can be conducted even if a plurality of processes are taken as the unit.

Furthermore, it is also possible to form a group by taking application software in the host 1a as the unit and conduct the synchronization confirmation by taking a group as the unit. In this case, the sequence number of the asynchronous transfer is maintained by taking a group as the unit. A plurality of groups are defined in the large-sized disk array device. When the application software conducts the synchronization confirmation, the application software specifies a group name in a synchronization completion request, and consequently it becomes possible to conduct the synchronization confirmation independently for each group.

Figure 2:
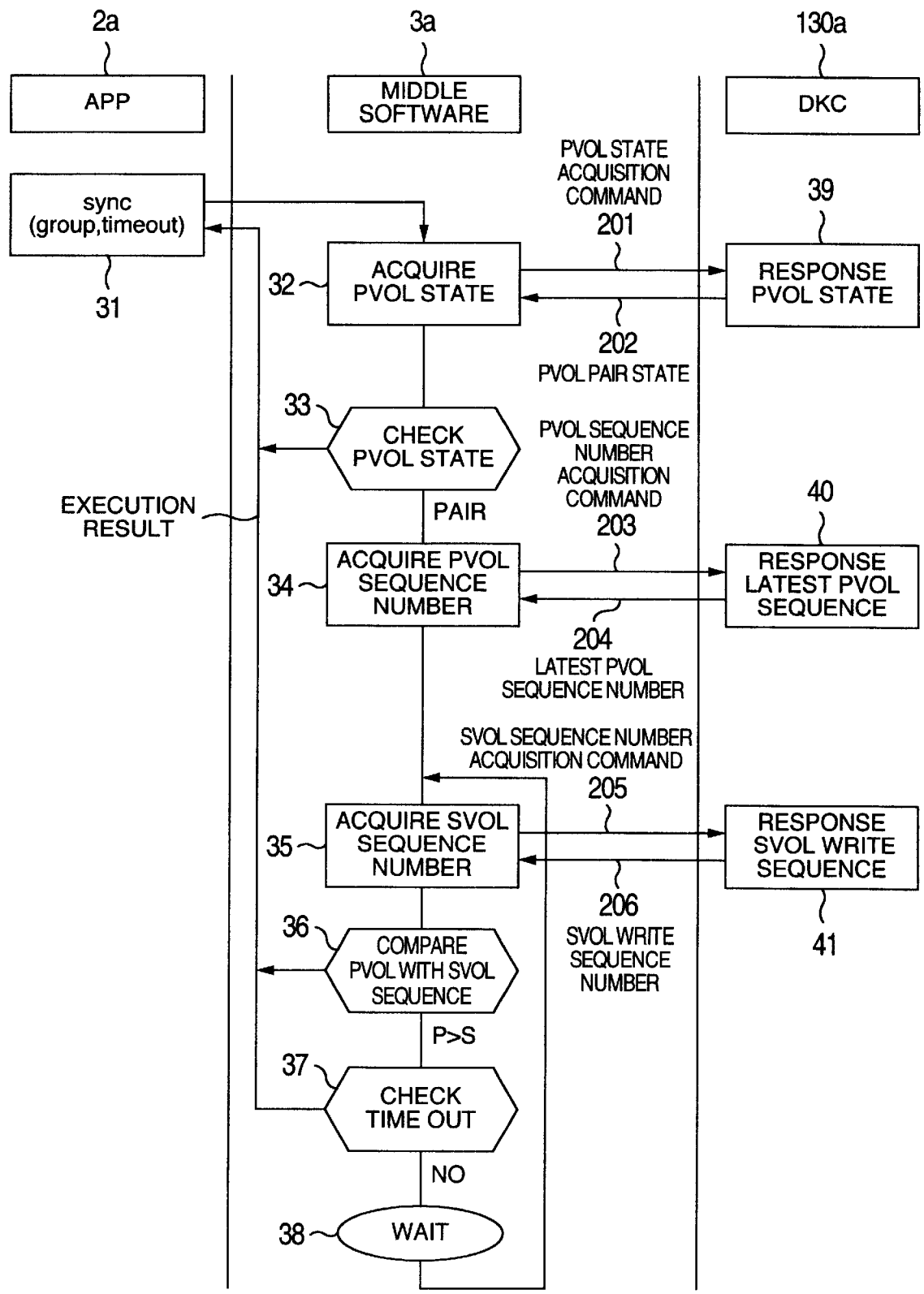
FIG. 2 is a flow chart of whole control in the embodiment of the present invention.
Figure 3:
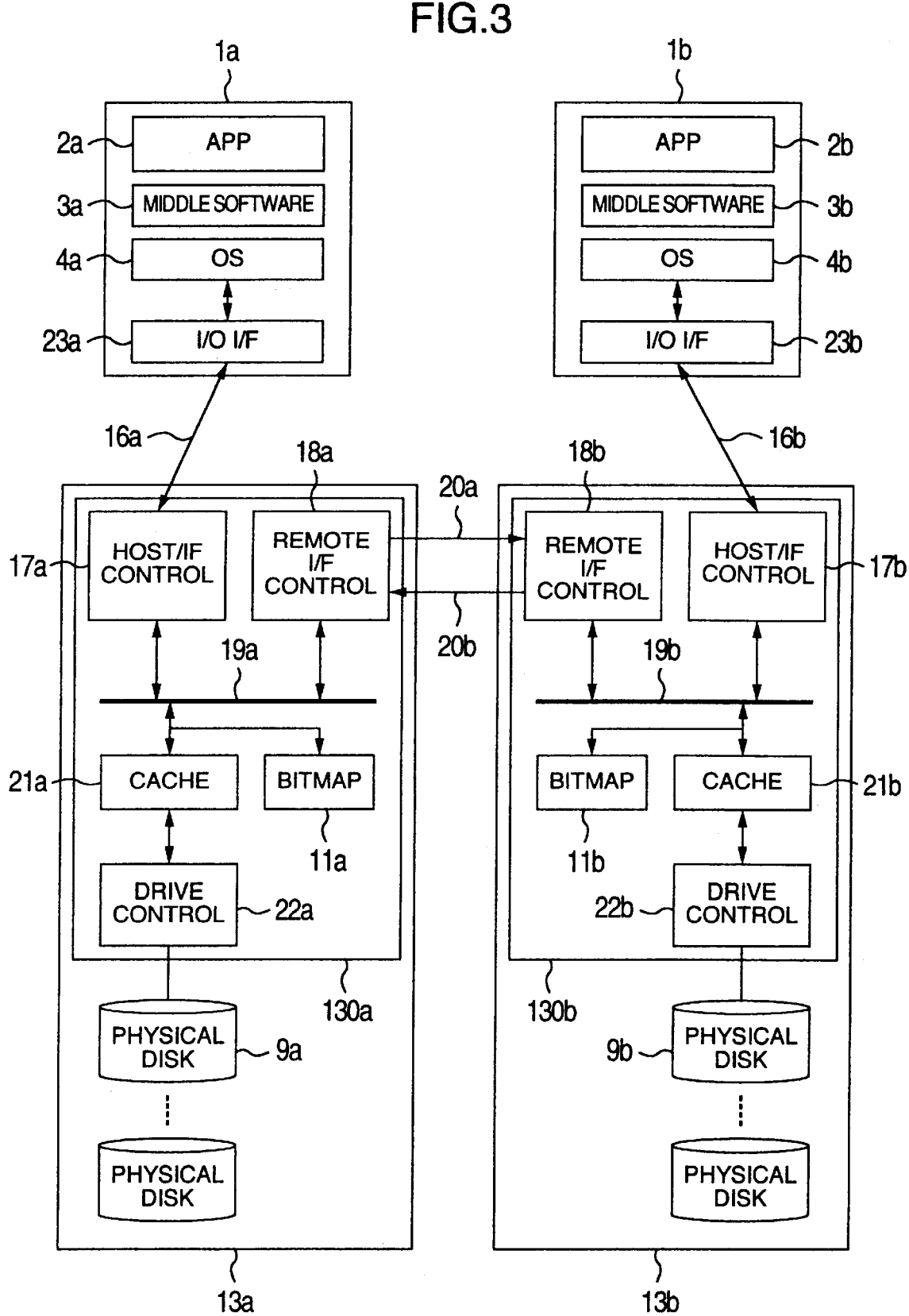
FIG. 3 is a configuration diagram showing a whole of a typical HA cluster to which the present invention is applied.

FIG. 2 is a diagram showing a flow of the whole control of matters described by referring to FIG. 1. Hereafter, the operation will be described on the basis of the control flow. An SVOL sequence number used in description of FIG. 2 has the same meaning as the SVOL write sequence number in the description of FIG. 1.

First, the control flow shows control of the APP 2a which is application software of the host la, the middle software 3a which executes the pair control and the sync command, and a DKC 130a which effects in the large-sized disk array device 13a data transfer control between the host 1a and the physical disk 9a.

Upon reaching a commit point, the APP 2a issues a commit command, and writes data stored in a data buffer of the host computer 1a into the large-sized disk array device 13a. (This is not illustrated in FIG. 2.)

Subsequently, immediately after completion of the commit to a database, the APP 2a issues a sync command. The sync command has two arguments, besides a command code (not illustrated) which indicates that the command is the sync command. A first argument "group" specifies the above described group name. A second argument "timeout" specifies a maximum synchronization completion wait time. After having issued the sync command, the APP 2a waits until a report of synchronization completion is received from the middle software 3a or a report of synchronization failure is received.

The middle software 3a executes a sync (group, timeout) command 31. In order to first check in the command the pair state of the PVOL (principal volume) 10a in the large-sized disk array device 13a, the sync (group, timeout) command 31 issues a PVOL state acquisition command 201 to the large-sized disk array device 13a (PVOL state acquisition step 32). As a response to this command, a disk controller (DKC) 130a serving as a control section of the large-sized disk array device 13a returns a PVOL pair state 202 (PVOL state response step 39). When "group" has been specified, the sequence number of the PVOL is managed by taking a group as the unit. Hereafter, assuming that the group is restricted to a specific group, description will be given by omitting a difference of group.

Upon receiving the PVOL pair state 202 from the large-sized disk array device 13a, the middle software 3a checks the PVOL pair state. If the state is other than PAIR (i.e., the state is PSUS or PSUE), then the middle software 3a regards the duplication as suspended and returns synchronization failure to the APP 2a (PVOL state check step 33). It is assumed that the large-sized disk array device has a function of managing these states.

On the other hand, if the state is "pair," the state is judged to be a duplicated state at the PVOL state check step 33. In order to check a latest PVOL sequence number of write data queued in the FIFO 7, the middle software 3a issues a PVOL sequence number acquisition command 203 to the large-sized disk array device 13a (PVOL sequence number acquisition step 34).

In response to this command, the large-sized disk array device 13a returns a latest PVOL sequence number added to a latest data queued in the FIFO 7 to the middle software 3a as a latest PVOL sequence number 204 (latest PVOL sequence response step 40).

The middle software 3a in the present invention holds the acquired PVOL (principal volume) sequence number during the synchronization confirmation, and uses it for comparison with the SVOL (subsidiary volume) sequence number acquired later.

Subsequently, in order to obtain the SVOL sequence number of the remote site, the middle software 3a issues a SVOL sequence number acquisition command 205 to the large-sized disk array device 13a (SVOL sequence number acquisition step 35). The large-sized disk array device 13a acquires a latest sequence number corresponding to data written from the large-sized disk array device 13b of the remote site into the SVOL 10, and returns a latest SVOL write sequence number 206 to the middle software 3a as an acknowledgement to the SVOL sequence number acquisition command (SVOL write sequence response step 41).

By the way, for acquiring a latest sequence number corresponding to data written from the large-sized disk array device 13b of the remote site into the SVOL 10b, the large-sized disk array device 13a of the local side first issues a command for inquiring a latest SVOL write sequence number concerning latest data written into the SVOL, to the large-sized disk array device 13b of the remote side. In the present embodiment, this command is inquired via remote I/F controllers 18a and 18b by using a communication path for transferring typical copy data. Upon receiving the query command, the large-sized disk array device of the remote side analyzes the query command, and acquires a latest SVOL write sequence number concerning latest data written into the SVOL.

It is now assumed that the latest SVOL write sequence number is updated in such a stage that the latest SVOL write sequence number is recorded in a specific memory included in the large-sized disk array device 13b and held by the remote side in such a form as to be able to ensure copy data positively. In the present embodiment, the case where the FIFO 8 is used is shown by taking the case where the data reception order on the remote side does not always coincide with the order of data issued by the host computer into consideration. In the present embodiment, therefore, such a state that the remote side can positively copy data is such a state that management of received data is shifted from the FIFO 8 to a cache memory corresponding to the SVOL without a drop in sequence number. (It is assumed that the present system ensures that data stored in the cache are written into the physical disk.) And a sequence number provided to data in this state becomes an SVOL write sequence number. For example, assuming that there are received data having sequence numbers "2," "3," and "5" in the FIFO, received data having the sequence numbers "2" and "3" are written into the cache corresponding to the SVOL. However, received data having the sequence number "5" is not written into the cache corresponding to the SVOL. The SVOL write sequence number at this stage is "3." If thereafter data having a sequence number "4" is received, then the received data having the sequence numbers "4" and "5" are stored in the cache corresponding to the SVOL one after another. Here, for the first time, a latest SVOL write sequence number at such a stage that the remote side holds copy data in a positively warrantable form becomes "5." On the other hand, if the storage system of the local side and the communication paths between the local side and the remote side can assure the sequence property of data received on the remote side, then the storage system of the remote side can use a sequence number provided to received data as the latest SVOL write sequence number referred to in the present embodiment, when the data is received, such as, for example, when the remote I/F control circuit has received data.

The large-sized disk array device 13b of the remote side transfers the acquired latest SVOL write sequence number to the large-sized disk array device 13a of the local side as a response to the above described query command.

Furthermore, the following different method for acquiring a latest sequence number of the remote side may be used. In the method, the large-sized disk array itself of the remote side notifies the local side of a latest SVOL write sequence number periodically or when there is data writing update for the SVOL. The local side records the latest SVOL write sequence number. When a sync command has occurred, the latest SVOL sequence number recorded on the local side is read out and used.

At the next step 36, the middle software 3a compares the held PVOL (latest) sequence number with the held SVOL (write) sequence number. If PVOL sequence number<SVOL write sequence number, then the middle software regards data corresponding to the PVOL sequence number as data already written into the SVOL side, and returns synchronization completion to the APP 2a (PVOL and SVOL sequence comparison step 36).

On the other hand, if PVOL sequence number>SVOL write sequence number, the middle software 3a judges the synchronization to be unaccomplished (judges data not to be written on the remote side), and proceeds to the next step where the middle software 3a checks timeout. If a specified timeout value is exceeded, then the middle software 3a judges synchronization completion timeout to have occurred, and returns synchronization failure to the APP 2a (timeout check step 37). If the specified timeout value is not exceeded, then the middle software 3a waits for a predetermined time (wait step 38), and thereafter repeats the steps 35 to 38 until the synchronization is completed. At a time point when in the repetition the condition "PVOL sequence number<SVOL sequence number" is satisfied, the synchronization is completed and control is returned to the APP 2a serving as the calling source which has issued the sync command. At a time point when the control of the sync command is returned, the APP 2a checks the return value and determines the synchronization completion.

In cooperation with the middle software 3a, the APP 2a of the host 1a executes the sync command shown in the present invention immediately after it has conducted the commit of a transaction of the database or the like, as heretofore described. Therefore, the APP 2a can know whether data written into the disk array device before issuance of the present sync command is stored positively into the disk array device of the remote side. When viewed from an application in the host computer with a different angle, asynchronous copy looks like remote copy capable of being subjected to synchronous processing (processing for making data coincide within the computer and within the storage device of the remote side) every application by issuing the sync command.

Figure 4:
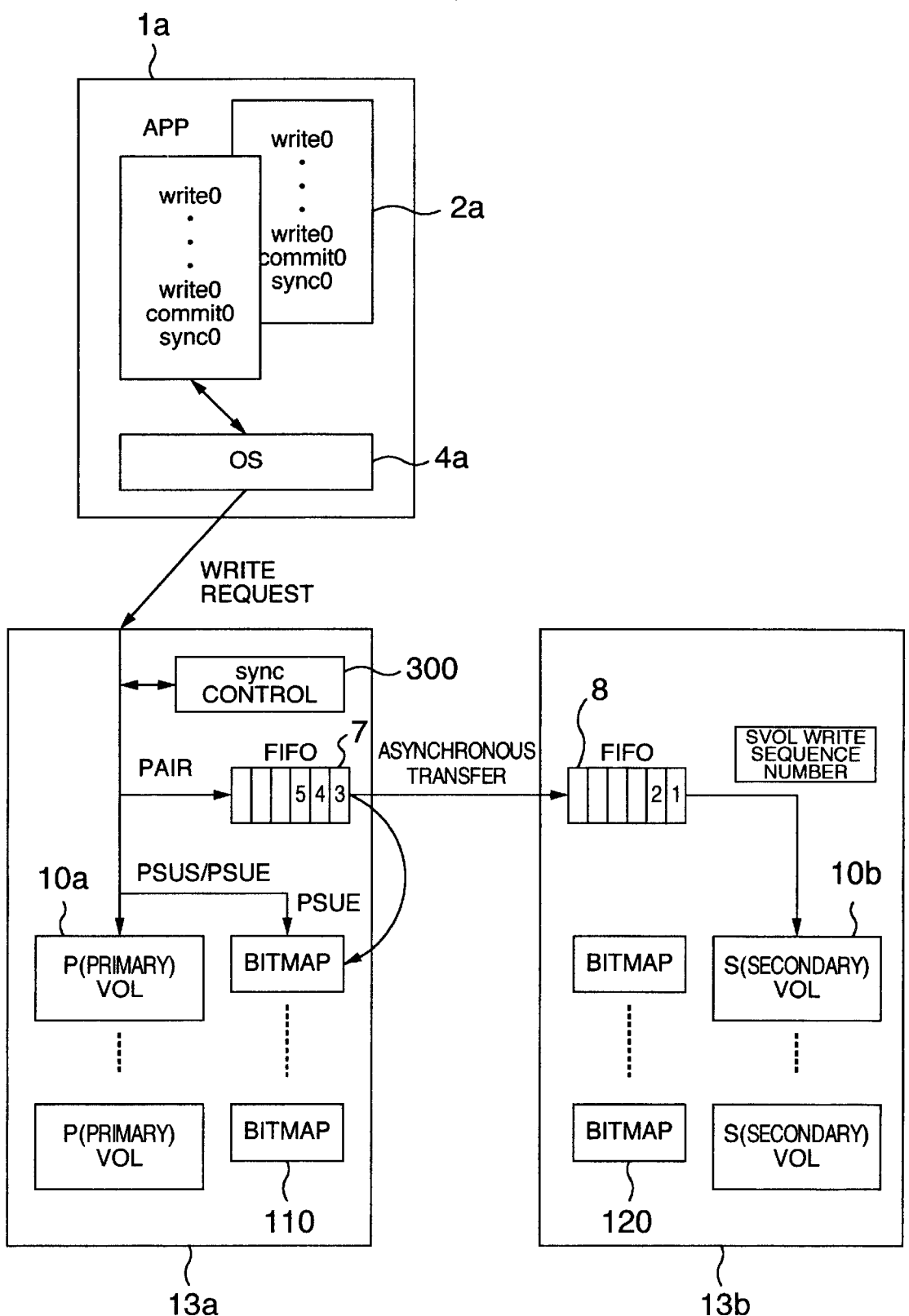
FIG. 4 is a logical block diagram of a second embodiment of the present invention.
Figure 5:
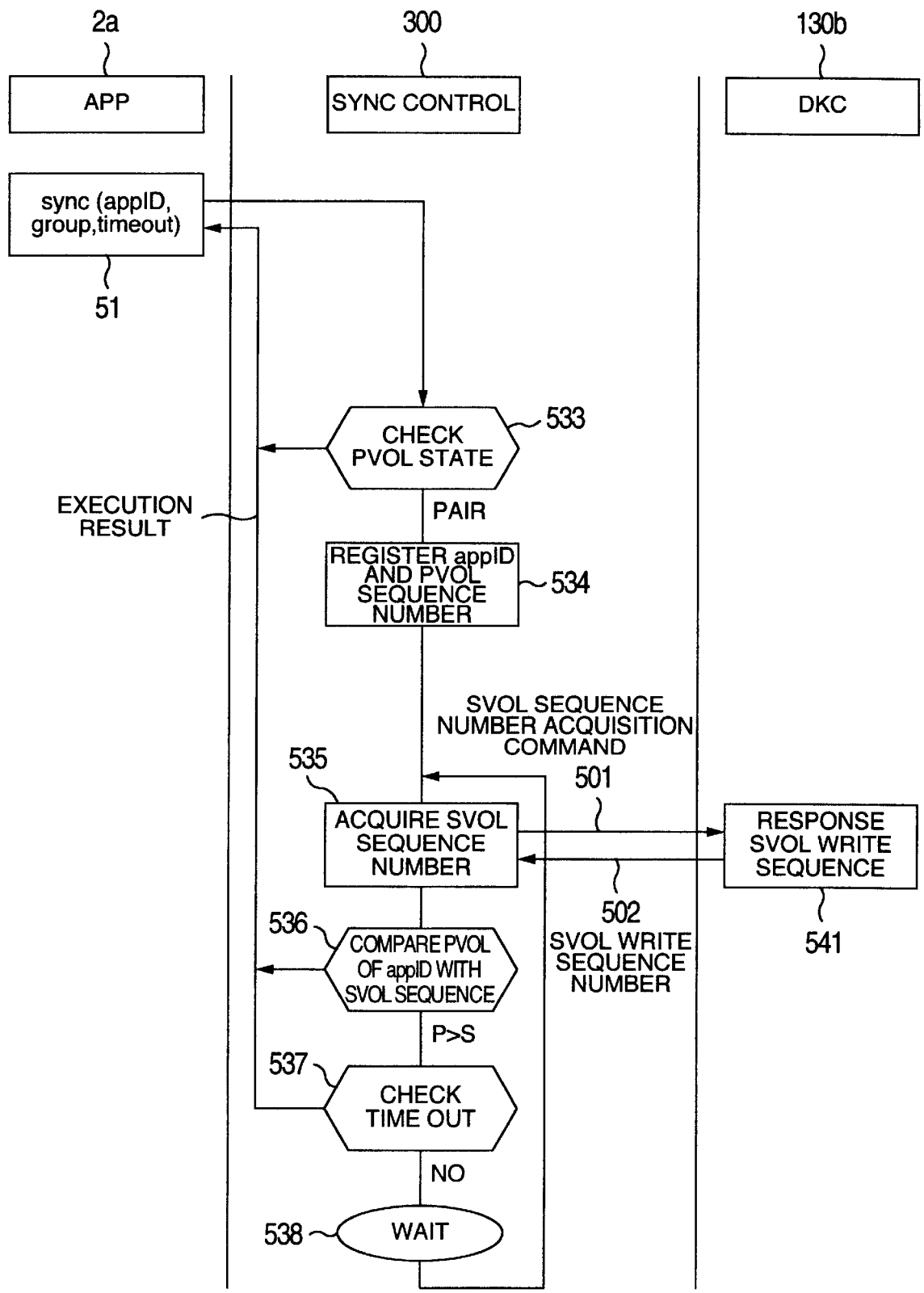
FIG. 5 is a flow chart of a whole corresponding to the second embodiment of the present invention.

FIGS. 4 and 5 show the second embodiment of the present invention in which control of the middle software 3a is effected in the large-sized disk array device 13a for the purpose of reducing the load of middle software control of the host device 1a.

FIG. 4 is a logical block diagram of a storage system according to the second embodiment of the present invention, where middle software control described by referring to FIGS. 1 and 2 is effected in the large-sized disk array device. FIG. 4 is substantially the same in logical configuration as FIG. 1 except that the function implemented by the middle software 3a of FIG. 1 is replaced by sync control 300 (described later) of FIG. 4. The function of the sync control 300 is implemented by executing a program for implementing the present function in the "host I/F control circuit (17a)" or the "remote I/F control circuit (18a)."

The APP 2a in the host 1a conducts writing into the database as a transaction in the same way as the above described embodiment, finally issues a "commit," and thereafter issues a sync command which is a feature command of the present invention. This sync command is inputted to the disk array device 13a via the OS. Here, in the sense of confirming the commit operation, the sync command is inputted after the issuance of the "commit." However, the timing of issuing the sync command is not restricted to this time point, but the sync command can be issued at a time point when the application program has recognized the necessity. Furthermore, the processing of the sync command on the disk array device side described hereafter does not depend upon the issuance time point of the sync command, either.

The sync command is a function (to which sync control 300 described later corresponds) such as a microprogram provided to a host connected to the large-sized disk array device by the large-sized disk array device and incorporated in the large-sized disk array device. For example, a microprocessor or the like in the host I/F control circuit of FIG. 1 executes while communicating with the remote I/F control circuit or the like.

Here, as parameters, the sync (appID, group, timeout) command 51 has "appID" used to identify the sync request process by the sync control 300 of the large-sized disk array device 13a of the local side, the above described "group" (the above described group name), and "timeout" for specifying a maximum synchronization completion waiting time.

This sync command 51 is delivered to sync control 300 of the large-sized disk array device 13a via the OS 4a. Upon receiving the sync command, the sync control 300 checks the pair state of the volume in the same way as the foregoing embodiment. If the state is the pair state, then the sync control 300 registers the "latest PVOL sequence number" of the FIFO 7 and the "appID" delivered as the sync command parameter, in a memory included in the disk array device, and holds the latest PVOL sequence number as a sequence number immediately following the "commit."

Subsequently, the sync control 300 acquires a SVOL write sequence number of the remote side, and repetitively tests the SVOL write sequence number until the relation "PVOL sequence number"<"SVOL write sequence number" is satisfied. Waiting is thus conducted in the sync control 300. If the condition is satisfied, then the sync control 300 returns "appID" to the APP 2a which is the calling source via the OS 4a as an acknowledgement of synchronization completion. Upon receiving this "appID," the APP 2a regards completion of the sync command as synchronization completion. A concrete acquisition method of the PVOL sequence number and the SVOL write sequence number is the same as the foregoing description.

Heretofore, the APP 2a in the host 1a has been described as one process from the OS 4a. The APP 2a may exist as a plurality of processes. If in this case sync commands are issued from a plurality of processes, then the sync control identifies them by "appID," registers "appID" and the latest PVOL sequence number at the time point when each of sync commands respectively corresponding to processes is received, and compares them with the SVOL sequence number obtained later. As a result, it is possible to conduct the synchronization confirmation by taking a plurality of processes as the unit. The result is returned to an application having the registered "appID."

Furthermore, it is also possible to combine a plurality of applications included in the host 1a into a group and conduct the synchronization confirmation by taking this group as the unit. In this case, a sequence number of asynchronous transfer is maintained by taking this group as the unit. A plurality of groups are defined in the large-sized disk array device. When application software conducts the synchronization confirmation, the application software specifies a group name in a synchronization completion request. As a result, it becomes possible to conduct the synchronization confirmation independently by taking a group as the unit.

FIG. 5 is a diagram showing the whole control flow of the matters described with reference to FIG. 4. Hereafter, the operation will be described in detail on the basis of the control flow. An SVOL sequence number used in the description of FIG. 5 has the same meaning as an SVOL write sequence number. The control flow shows control of the APP 2a serving as application software of the host 1a, the sync control 300 in the large-sized disk array device 13a of the local side for executing the pair control and the sync command, and disk control DKC 130b of the large-sized disk array device 13b of the remote side.

Immediately after the completion of the commit to the database, the APP 2a issues a sync (appID, group, timeout) command 51. The first argument "appID" of the sync command 51 is an argument to be used by the sync control 300 of the large-sized disk array device 13a to identify a sync request process (application) included in the host 1a. As a result, it becomes possible to conduct the synchronization confirmation for each process (application) issuing a sync request. The second argument "group" is used when specifying the above described group name. The third argument "timeout" specifies a maximum synchronization completion waiting time.

The sync control 300 of the large-sized disk array device 13a executes the sync (appID, group, timeout) command 51. First, the sync control 300 checks the pair state of the PVOL 9 included in the large-sized disk array device 13a (PVOL state check step 533).

If the state is other than PAIR, i.e., PSUS or PSUE as a result of the PVOL state check 533, then the sync control 300 judges the duplication to be suspended, and returns synchronization failure to the APP 2a. If the state is "pair," then the state is the duplicated state, and write data is already queued in the FIFO 7. Therefore, the sync control 300 registers a latest PVOL sequence number and "appID" in a memory in the large-sized disk array device ("appID and PVOL sequence number registering step 534). The registered PVOL sequence number and "appID" are held during the synchronization confirmation, and later used for comparison with an SVOL sequence number.

Subsequently, for comparing the PVOL sequence number with the SVOL sequence number of the remote site, the sync control 300 issues an SVOL sequence number acquisition command 501 to the disk controller 130b (see disk array device of the remote side of FIG. 3) of the large-sized disk array device 13b of the remote side (SVOL sequence number acquisition step 535).

In response to this command 501, the large-sized disk array device 13b returns a latest SVOL write sequence number 502 to the disk array device 13a as an SVOL write sequence response (SVOL write sequence response step 541). A concrete acquisition method of the SVOL write sequence number is the same as that of the foregoing embodiment.

At the next step 36, the sync control 300 of the disk array device 13a of the local side compares a PVOL sequence number corresponding to the held "appID" with the SVOL sequence number. If "PVOL sequence number"≦"SVOL sequence number," the sync control 300 judges the PVOL sequence number to be already written, and returns synchronization completion together with the "appID" to the application software APP 2a. On the other hand, if "PVOL sequence number">"SVOL sequence number," the synchronization is not accomplished, and consequently the sync control 300 proceeds to the next waiting step 537 (PVOL of "appID" and SVOL sequence comparing step 536).

At the timeout checking step 537, timeout check 537 is conducted. If a specified timeout value is exceeded, the sync control 300 judges the synchronization completion to be timeout, and returns synchronization failure to the APP 2a. On the other hand, if the specified timeout value is not exceeded the sync control 300 waits for a predetermined time (wait step 538).

Thereafter, the sync control 300 repeats steps 535 to 538 until the synchronization is accomplished. At a time point when the condition "PVOL sequence number≦"SVOL sequence number" is satisfied, the sync control 300 judges the synchronization to be accomplished, and returns control to the APP 2a which is the calling source of the sync command 51. At a time point when the control of the sync command is returned, the APP 2a checks the "appID," checks a return value (a value indicating whether the synchronization is accomplished), and confirms the synchronization completion.

As heretofore described, it becomes possible that upon receiving a sync command the disk array device determines whether data of the write request from the host has been positively copied into the disk array device of the remote side and then reports the fact to the host. Even when the disk array device is conducting asynchronous remote copy, therefore, the host can know exactly whether data written into the disk array device before issuance of the sync command is transferred to the remote side, by issuing a sync command. It thus becomes possible to make the commit control required in the database or the like positive. When viewed from an application in the host computer using the present embodiment with a different angle, asynchronous copy looks like remote copy capable of being subjected to synchronous processing (processing for making data coincide within the computer and within the storage device of the remote side) every application by issuing the sync command.

In the above described embodiment, the present invention has been described in such a form that issuance of a sync command follows issuance of a commit command. However, the following variations are also possible.

In a method of a first variation, the function of the middle software is expanded in the first embodiment. When conducting asynchronous data transfer, therefore, a conventional commit command received from an application is recognized as "conventional commit command+sync command" and processed. To be concrete, upon receiving a commit command, the middle software 3a expanded in function first writes data stored in the data buffer in the computer into the storage system. In addition, the middle software 3a determines whether a volume containing data to be committed is under asynchronous copy. When the subject volume is under asynchronous copy, the middle software 3a issues a query command corresponding to the first embodiment of the present invention to the storage system of the local side. Thereafter, the middle software 3a receives write completion from the storage system of the local side. At this time point, the middle software 3a does not return a return for the commit command to the application, and waits for a response to the previous query command. It is not until the middle software 3a receives a response to the query command from the storage system and write data can be confirmed in the storage system of the remote side that the middle software 3a returns a return for the commit command to the application. In this method, the application need not issue a sync command. This results in a merit that it is not necessary to be conscious that synchronous copy is under way.

In a method of a second variation, when the storage system of the local side is conducting asynchronous remote copy, the storage system of the remote side periodically sends a report concerning until what time point, data of the write command have been stored, to the host computer which issues a write command. For example, the storage system of the local side periodically stores the time when a certain write request has been issued by the host. At such a stage that data corresponding to all write requests issued before the write request have been positively stored in the storage system of the remote side, previously recorded time is returned to the host computer. By doing so, the host computer periodically knows write requests issued until what time have been positively stored in the storage system of the remote side. On the other hand, the application of the host side issues a commit command in the same way as the conventional technique. At the time point when the middle software has received this commit command, the middle software issues a write request in order to write data stored in the data buffer into the storage system of the local side. At this time, the final time when the write request has been issued is stored. And the middle software receives every write completion for this write request. In addition, when the middle software has received the above described time periodically reported by the storage system of the local side which is equal to or later than the final time, the middle software returns a return for the previous commit command to the application. In the method of the second variation, the application of the host side need not issue a sync command. This results in a merit that it is not necessary to be conscious that synchronous copy is under way. Furthermore, the storage system merely notifies the host computer of the situation of the remote side spontaneously. Therefore, the interface between the host computer and the storage system becomes simple.

In the method of the second variation, there is shown an example in which the storage system of the local side periodically reports write requests issued until what time have been positively written into the storage system of the remote side. As a matter of course, the storage system having such a function can be utilized in the data synchronization confirmation for the application as described in the present embodiment. Besides it as well, however, the host computer provides information which is important in knowing the state of the storage system. It can be said that the present storage system is a storage system which is manageable, easily controllable, or easily usable.

In the present invention, when conducting asynchronous remote copy, information concerning the storage system of the remote side needed to determine whether the data of the write request is stored on the remote side is provided to the host via the storage system of the local side. As a result, the application can confirm the coincidence between the data in the host and the data in the storage system of the remote side.

Furthermore, in the present invention, the storage system which conducts asynchronous remote copy notifies the host whether data of a write request has been stored on the remote side. As a result, the application in the host can confirm the coincidence between the data in the host and the data in the storage system of the remote side.

What is claimed is:

1. A storage system which receives a write command from an upper device as a communicating object, and stores data contained in the write command into a storage disk comprising:

a first interface circuit supplied with the write command from said upper device;

a second interface circuit for outputting data contained in said write command received from said upper device and information identifying said data to a different storage system asynchronously with a timing different from a received timing of the write command from the upper device;

said first interface circuit, in response to reception of a query command concerning said data from said upper device, outputting information identifying said data outputted together with said data, before transmission from said second interface to said different storage system, to said upper device; and said first interface circuit receiving the information inputted to said different storage system and the information identifying said data through said second interface circuit and outputting the same, to said upper device.

2. A storage system according to claim 1, wherein said information indicates a sequence property of a plurality of data included in a plurality of said write commands.

3. A storage system according to claim 1, wherein a plurality of said write commands are divided into groups, said information identifying data is managed so as to correspond to groups of said write commands, and said information identifying data is outputted to a program so as to correspond to the groups.

4. A storage system of a local side connected to an upper device of the local side and a storage system of a remote side for use, said storage system of the local side comprising:

means for receiving a write command from said upper device;

means for holding information indicative of whether data contained in the write command received from said upper device has been transferred to the storage system of the remote side, and asynchronously transmitting the data contained in said write command to said storage system of the remote side;

means for receiving a query command for inquiring whether said storage system of the remote side has received said data, from said upper device; and means for transmitting a response to said query command, to said upper device.

5. A storage system of a local side according to claim 4, wherein whether a storage system of the remote side has received said data corresponds to whether said data has been stored in a cache of said storage system of the remote side.

6. A storage system of a local side connected to an upper device of the local side and a storage system of a remote side for use, said storage system of the local side comprising:

means for receiving a write command from said upper device;

providing means for, when data contained in the write command received from said upper device is stored on a physical disk of said storage system of the local side, providing an identifier indicative of a received sequence number of the data;

means for holding information indicative of whether data contained in the write command received from said upper device has been transferred to the storage system of the remote side, and asynchronously transmitting the data contained in said write command to said storage system of the remote side together with said identifier;

means for receiving a query command for inquiring whether said storage system of the remote side has received said data, from said upper device; and means for transmitting a response to said query command, to said upper device;

wherein said query command inquires about an updated data which said storage system of the local side has received from said upper device, and said data includes said identifier provided to a data which has not yet been copied to said storage system of the remote side and an identifier provided to the updated data which has been copied to said storage system of the remote side.

7. A storage system of a local side connected to an upper device of the local side and a storage system of a remote side for use, said storage system of the local side comprising:

means for receiving a write command from said upper device;

providing means for, when data contained in the write command received from said upper device is stored on a physical disk of the storage system of the local side, providing an identifier indicative of a received sequence number of the data;

a FIFO buffer holding the identifier provided by said providing means and data which has not yet been copied to said storage system of the remote side;

means for holding information indicative of whether data contained in the write command received from said upper device has been transferred to the storage system of the remote side, and asynchronously transmitting the data contained in said write command to said storage system of the remote side together with said identifier;

means for receiving a query command for inquiring whether said storage system of the remote side has received said data, from said upper device; and means for transmitting a response to said query command, to said upper device;

wherein said query command inquires about an updated data stored in said FIFO which said storage system of the local side has received from said upper device, and said data includes said identifier provided to a data which has not yet been copied to said storage system of the remote side and an identifier provided to the updated data which has been copied to said storage system of the remote side.

8. A response method of a storage system to an upper device, said response method comprising the steps of:

receiving a write command from said upper device;

writing data contained in the received write command into a cache contained in said storage system;

after having written data to said cache in said writing step and before transfer of the data to another storage system, returning a response to said write command, to said upper device;

transmitting data contained in said write command to a different storage system;

receiving a query command for inquiring whether said different storage system has received said data, from said upper device; and outputting a response to said query command, to said upper device.

9. A method of acquiring synchronization at a timing in an asynchronous copying system which asynchronously copies data of a storage system to a different storage system, comprising the step of:

receiving a write command from said upper device;

writing data contained in the received write command into a cache contained in said storage system;

after having written the data to said cache in said writing step and before transfer of the data to said different storage system, returning a response indicative of the completion of said write command, to said upper device;

when the data which has been written into said cache is written into a storage disk connected to said storage system, providing said data with an identifier indicative of an issuing sequence of commands transmitted from said upper device; and transmitting the data provided with the identifier, to the different storage system together with said identifier;

said storage system outputting to said upper device, the last identifier among identifiers which said different storage system receives without a drop in sequence number and an updated identifier held in said storage system, in response to a synchronization request from said upper device.

10. A method of acquiring synchronization at a timing in an asynchronous copying system according to claim 9, further comprising steps of, in said upper device, comparing the respective identifiers received in said outputting step; and recognizing completion of the requested synchronization when the comparison results are met.

11. A method of acquiring synchronization between a storage system and a different storage system at a predetermined timing in an asynchronous copying system which copies data contained in said storage system to said different storage system asynchronously with a received timing of a write request from an upper device, said storage system storing data contained in the write command into a storage disk in response to said write command, and said storage system including a buffer for temporally storing the data contained in the write request from the upper device, said synchronization acquiring method comprising:

- a first step of holding an identifier indicative of a sequence at which said storage system has received the write command, and said data in said buffer;
- a second step of transmitting the data and the data identifier held in said first step from said buffer to the different storage system asynchronously with a received timing of said write request from said upper device;
- a third step of receiving a sync command for making data stored in the storage system coincide with data stored in said different storage system, from said upper device;
- a fourth step of judging whether the data stored in said storage system and data stored in said different storage system which have received the sync command coincide with each other in said third step; and
- a fifth step of informing said upper device of the completion of synchronization when a coincidence is judged in said fourth step.

12. A method of acquiring synchronization according to claim 11, wherein in the judging of said fourth step, an identifier of data which has been held in said storage system but has not yet been copied in said different storage system, said data having received in a write command immediately before receiving of the sync command from the upper device, is compared with an identifier of an updated data which has been transmitted to said different storage system and whose received sequence is ensured.

13. A method of acquiring synchronization according to claim 11, wherein said sync command is issued continuously after said upper device has issued a commit command.

14. A recording medium storing a computer program which, when executed by a computer causes a processor in the computer to implement the method of acquiring synchronization according to claim 12.

* * * * *